United States Patent [19]

Malfroid et al.

[11] Patent Number: 4,826,934

[45] Date of Patent: May 2, 1989

[54] PROCESS FOR THE MANUFACTURE OF VINYL HALIDE POLYMERS MODIFIED WITH POLYMERS OF HETEROCYCLIC OXYGEN COMPOUNDS

[75] Inventors: Pierre Malfroid, Grez-Doiceau; Qui L. Nguyen, Sclessin Liege; Jean-Marie Blondin, Brussels, all of Belgium

[73] Assignee: Solvay & Cie (Société Anonyme), Brussels, Belgium

[21] Appl. No.: 96,527

[22] Filed: Sep. 15, 1987

[30] Foreign Application Priority Data

Sep. 18, 1986 [FR] France ................................ 86 13204

[51] Int. Cl.⁴ ............................................ C08F 283/06
[52] U.S. Cl. .................................... 525/412; 525/404; 525/415
[58] Field of Search ................. 528/416; 525/404, 412

[56] References Cited

U.S. PATENT DOCUMENTS

| | | | |
|---|---|---|---|
| 3,817,877 | 6/1974 | Malfroid | 528/416 |
| 3,884,994 | 5/1975 | Critchfield et al. | 525/412 |
| 4,281,087 | 7/1981 | Heuschen et al. | 525/361 |

FOREIGN PATENT DOCUMENTS

| | | | |
|---|---|---|---|
| 1338264 | 10/1971 | United Kingdom | 525/404 |
| 1507844 | 6/1975 | United Kingdom | 525/404 |
| 1454981 | 11/1976 | United Kingdom . | |

*Primary Examiner*—Lewis T. Jacobs
*Assistant Examiner*—Susan Berman
*Attorney, Agent, or Firm*—Spencer & Frank

[57] ABSTRACT

In a first stage, a heterocyclic oxygen compound is polymerized by an ionic route in a vinyl halide and, in a second stage, the vinyl halide, to which other unsaturated monomers capable of being polymerized by a radical route may be added if desired, is polymerized by a radical route in aqueous dispersion and in the presence of the polymerization mixture originating from the first stage.

11 Claims, No Drawings

PROCESS FOR THE MANUFACTURE OF VINYL HALIDE POLYMERS MODIFIED WITH POLYMERS OF HETEROCYCLIC OXYGEN COMPOUNDS

The present invention relates to a process for the manufacture of vinyl halide polymers modified with polymers of heterocyclic oxygen compounds.

It is known to modify the properties of thermoplastic polymers, such as, for example, their plasticity, their processability or their impact strength, by blending with other polymers, known as modifying polymers, and especially those of vinyl halide polymers such as polyvinyl chloride, by blending with polymers of heterocyclic oxygen compounds such as polycaprolactone (patent U.S. Pat. No. 3,592,877) and polyalkene oxides such as polypropylene oxide and polyepichlorohydrin (patent Nos. FR-A-1,545,796 and FR-A-1,559,479).

Modification of the properties of thermoplastic polymers by blending with modifying polymers requires the manufacture, the separation and the drying of each of the polymers intended for blending. The resultant polymer blends generally lack homogeneity and therefore suffer from a certain irreproducibility of their properties. Lastly, the manufacture of polymers of heterocyclic oxygen compounds is usually carried out in inert organic solvents and, at the end of polymerization, these have to be recovered, purified and recycled to the polymerization.

The present invention is intended to provide a process for the manufacture of vinyl halide polymers modified with polymers of heterocyclic oxygen compounds, which does not have the abovementioned disadvantages and which, in particular, results in a very simple and economical manner, in the production of modified polymers of very high homogeneity.

To this end, the present invention relates to a process according to which, in a first stage, a heterocyclic oxygen compound is polymerized by an ionic route in a vinyl halide and, in a second stage, the said vinyl halide, to which other unsaturated monomers capable of being polymerized by a radical route (comonomers) may be added if desired, is polymerized by a radical route in aqueous dispersion and in the presence of the polymerization mixture originating from the first stage.

It is known to polymerize heterocyclic oxygen compounds such as alkene oxides and lactones by an ionic route in inert organic solvents such as ethers, alkanes, aromatic hydrocarbons and halogenated hydrocarbons (patent Nos. FR-A-2,183,545 and FR-A-2,258,410).

A surprising effect of the process according to the invention lies in the possibility of being able to perform the ionic polymerization of heterocyclic oxygen compounds in a vinyl halide monomer without the latter's affecting the ionic catalyst and of being able subsequently to perform the polymerization of the said vinyl halide by a radical route in aqueous dispersion in the presence of the polymerization mixture originating from the first stage, without the catalyst residues and/or the residual monomers from the first stage affecting the progress of the aqueous dispersion polymerization cf the vinyl halide monomer.

A "heterocyclic oxygen compound" is intended to denote cyclic ethers and esters and mixtures thereof.

Among the cyclic ethers, preference is given to those whose heteroatomic ring contains from 3 to 7 atoms. By way of examples of such cyclic ethers there may be mentioned ethylene oxide (oxirane), oxetane, tetrahydrofuran (or oxolane), tetrahyropyran (or oxane) and oxepane and their alkylated and/or halogenated substitution derivatives. Cyclic ethers which are particularly preferred are oxirane derivatives. A nonlimiting list of the oxirane derivatives which may be employed in the first stage of the process according to the invention comprises epoxyalkanes, haloepoxyalkanes, glycidyl ethers and esters and, in particular, ethylene and propylene oxides, epichlorohydrin, allyl glycidyl ether, glycidyl methacrylate and mixtures thereof.

Among cyclic esters, preference is given to lactones and, in particular, to lactones whose heteroatomic ring contains from 4 to 16 atoms. By way of examples of such lactones there may be mentioned β-propiolactone, γ-butyrolactone, δ-valerolactone, ε-caprolactone, caprylolactone and laurolactone, as well as their alkylated and/or halogenated substitution derivatives such as β,β-bis-(chloromethyl)-β-propiolactone, pivalolactone, methylcaprolactones and chlorocaprolactones. The cyclic esters which are particularly preferred are the unsubstituted lactones whose heteroatomic ring contains 4, 7 or 8 atoms, that is to say β-propiolactone, ε-caprolactone and ξ-oenantholactone. A cyclic ester which is very particularly preferred is ε-caprolactone.

As stated earlier, several heterocyclic oxygen compounds may be used, this being done either simultaneously to form random copolymers or successively to form block copolymers. The properties of the polymers of heterocyclic oxygen compounds (modifying polymers) may therefore be modified as a function of the choice of the heterocyclic oxygen monomer(s) and of the way in which it is, or they are, used, simultaneously or successively.

"Vinyl halide" is intended to denote the vinyl halide monomers corresponding to the general formula:

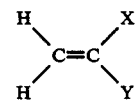

in which X denotes a halogen atom and Y denotes a hydrogen atom or a halogen atom which is identical with or different from X. The vinyl halide monomers which may be employed in the first stage thus include vinyl and vinylidene halides and mixtures thereof and, in particular, vinyl and vinylidene chlorides, bromides, fluorides and iodides and mixtures thereof. Nevertheless, preference is given to vinyl and vinylidene chlorides and fluorides. A vinyl halide monomer which can be employed in the first stage and which is very particularly preferred is vinyl chloride.

The unsaturated comonomers which are capable of being polymerized by a radical route in the second stage may be chosen from any of the usual comonomers for vinyl halide monomers. By way of examples of such comonomers there may be mentioned olefins, halogenated olefins, vinyl ethers, vinyl esters, as well as acrylic esters, nitriles and amides.

"Vinyl halide polymer" is intended, therefore, to denote the homopolymers and the random or block copolymers of vinyl halide monomers such as defined above, containing at least 50% by weight and, preferably, at least 65% by weight of vinyl halide.

"Modified vinyl halide polymer" is intended, therefore, to denote the vinyl halide polymers, homo- and copolymers, such as defined above and modified by polymers, homo- or copolymers, of heterocyclic oxygen compounds such as defined above.

The ionic polymerization of the heterocyclic oxygen compound(s) is performed using one or more ionic catalysts chosen from the usual ionic (cationic and anionic) catalysts. By way of examples of such catalysts there may be mentioned Friedel-Crafts catalysts, Ziegler-Natta catalysts, metal alkyls such as alkylaluminiums, alkylzincs and alkyltins. Nevertheless, preference is given to anionic catalysts and, still more particularly, to coordinated anionic catalysts. By way of examples of such coordinated anionic catalysts there may be mentioned the reaction products of metal alkyls such as alkylaluminiums and alkylzincs with water and/or an alcohol or a polyol. Coordinated anionic catalysts which are very particularly preferred consist of aluminium alkyl and alkoxy derivatives complexed with tetrahydrofuran, of general formula:

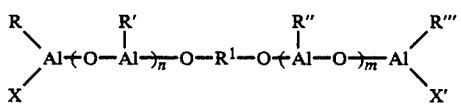

in which n and m denote integers from 0 to 10, whose sum is at least 1; R, R', R" and R''' denote hydrocarbon groups containing from 1 to 18 carbon atoms; X and X' denote hydrogen, chlorine or a group R; and $R^1$ denotes a hydrocarbon group containing from 2 to 20 carbon atoms.

The manufacture of these catalysts is described in patent Nos. FR-A-2,183,545 and FR-A-2,258,410.

The catalyst concentration may vary within quite wide limits. The catalyst is generally employed in a proportion of 0.001 to 0.1 mole of active metal per mole of heterocyclic oxygen compound and, preferably, from 0.01 to 0.05 mole of active metal per mole of heterocyclic oxygen compound.

The relative quantities of heterocyclic oxygen compound(s) and of the vinyl halide monomer employed in the first stage are not critical. They depend essentially on the quantity of the modifying polymer which is intended to be incorporated into the final modified vinyl halide polymer. Where appropriate, the quantity of other unsaturated monomer(s) capable of being polymerized by a radical route, which it has been decided to add to the polymerization mixture originating from the first stage, will be taken into account before commencing the second stage, that is to say the radical polymerization of the vinyl halide and, where appropriate, of other monomer(s) capable of being polymerized by this route.

The general conditions for the ionic polymerization of the heterocyclic oxygen compounds are those usually empoyed for polymerization of this type, except that the polymerization is performed in a vinyl halide monomer and not in the customary organic solvent. To give an idea, the temperature of the polymerization reaction is generally below 100° C. and in most cases between 15° and approximately 60° C. and the operating pressure is equal to the saturation vapour pressure of the vinyl halide monomer or of the mixture of vinyl halide monomers at the chosen polymerization temperature. The polymerization time is generally between a few minutes and a few tens of minutes. The progress of the (exothermic) polymerization reaction is followed by measuring the temperature difference between the heat-transfer liquid and the polymerization mixture (positive Δt). The reaction is considered to be finished when the temperature difference Δt is equal to zero. Usually, the mixture is maintained at the polymerization temperature for another hour.

After the ionic polymerization of the heterocyclic oxygen compound, the polymerization mixture is allowed to cool to ambient temperature. All the ingredients required for the conventional radical polymerization of the vinyl halide monomer in aqueous dispersion are then added to it, including, where appropriate, the unsaturated comonomer(s) capable of being polymerized by a radical route, starting with water.

"Aqueous dispersion polymerization" is intended to denote all the polymerization methods in which the vinyl monomers are dispersed in the form of droplets in an aqueous liquid phase and, in particular, the polymerization in aqueous emulsion, suspension or microsuspension.

Any emulsifying agent may be employed as a dispersing agent in the aqueous emulsion polymerization, and in particular the anionic emulsifying agents such as sodium benzylsulphonate or sodium dodecylbenzenesulphonate, as also may nonionic emulsifying agents. It is also possible to employ any water-soluble radical polymerization initiator, and especially persulphates.

In suspension polymerization, the dispersion agents which are generally employed are conventional dispersing agents such as finely dispersed solids, gelatines, water-soluble cellulose ethers, synthetic polymers such as partially saponified polyvinyl acetates, polyvinylpyrrolidone, vinyl acetate/maleic anhydride copolymers and mixtures thereof. Surface-active agents may also be employed at the same time as the dispersing agents. The quantity of dispersing agent which is employed generally varies between 0.05 and 0.15% by weight relative to water.

In polymerization in microsuspension, sometimes also referred to as homogenized aqueous dispersion, an emulsion of monomer droplets is produced by virtue of powerful mechanical stirring and usually in the presence of emulsifying agents of the same kind as those mentioned above, and the polymerization is performed using liposoluble initiators.

Any liposoluble initiator may be employed in the suspension or microsuspension polymerization. By way of examples, there may be mentioned peroxides such as ditertbutyl peroxide, lauroyl peroxide and acetyl cyclohexylsulphonyl peroxide, azo compounds such as azobisisobutyronitrile and azobis-2,4-dimethylvaleronitrile, dialkyl peroxydicarbonates such as diethyl, diisopropyl, dicyclohexyl and di(tert-butylcyclohexyl) peroxydicarbonates, and boron alkyls. In general, these initiators are employed in a proportion of 0.01 to 1% by weight based on the monomers.

It is particularly advantageous to apply the process according to the invention to aqueous suspension polymerization.

In addition to dispersing or emulsifying agents and initiators, the polymerization mixture may also comprise various additives which are usually employed in conventional aqueous dispersion polymerization methods. As examples of such additives there may be mentioned agents which control the diameter of the polymer particles, agents which control the molecular weight, stabilizers and colorants.

The radical polymerization conditions do not differ from those usually employed. Thus, in the case of the manufacture of modified vinyl chloride polymers, the polymerization temperature is generally between 35° and 80° C. and the absolute pressure is generally less than 15 kg/cm$^2$. The water quantity employed is generally such that the total weight of the monomers represents 20 to 50% of the total weight of the water and the monomers.

The vinyl halide polymers produced according to the process of the invention are isolated in a conventional manner from the aqueous dispersion polymerization medium.

The process according to the invention permits simple and fast manufacture, without intermediate isolation of the modifying polymer, of homogeneous vinyl halide polymers which are custom-tailored by means of the choice of the nature, the quantity and the method of use (simultaneous or sequential) of the heterocyclic oxygen compound(s).

The examples which follow illustrate the process of the invention without, however, limiting it.

In all the examples, the catalyst used is an aluminium alkyl and alkoxy derivative, complexed with tetrahydrofuran, produced by the reaction of one mole of triisobutylaluminium, 0.25 mole of 1,4-butanediol and 0.25 mole of water, and complexed with 3.7 moles of tetrahydrofuran (according to Example 4 of Patent No. FR-A-2,183,545). In all the examples the catalyst concentration is 0.02 mole of aluminium per mole of heterocyclic oxygen compound.

EXAMPLE 1

Example 1 illustrates the manufacture of polyvinyl chloride modified with polyepichlorohydrin.

The reactor employed is a stainless steel laboratory reactor, 3 liters in capacity, fitted with a jacket for circulating a heat-transfer fluid, a conventional stainless steel paddle stirrer, a set of burette tubes for adding reactants and a conventional temperature control system.

Stage 1

Three evacuation cycles are applied, followed by nitrogen rinses. 0.6 g of organometallic catalyst, expressed as aluminium, is introduced at 25° C. under a nitrogen blanket. The reactor is isolated and the stirrer is started up (250 rev/min). 1,000 g of vinyl chloride are introduced via a burette tube, and the reactor contents are heated to 35° C. When the set temperature has been reached, 100 g of epichlorohydrin are introduced via a burette tube (time=$t_o$). The stirring is stopped after 15 minutes' running at 35° C. (time=$t_o$+15 minutes). The degree of conversion of epichlorohydrin is estimated at 100% (blank test).

Stage 2

Five minutes after the stirring has been stopped, 1,500 g of an aqueous solution containing 3.33 g/l of hydroxypropyl methyl cellulose (viscosity of a 2% aqueous solution at 20° C.: 100 mPa s) are introduced over 15 minutes via a burette tube. The stirrer is restarted (500 rev/min) and the reactor contents are cooled to 30° C. 10 ml of a 15% solution of azobisisobutyronitrile in dichloromethane are then added. The reactor contents are heated to and maintained at 62° C. When the operating pressure has dropped by 3 bars, 15 ml of 2N aqueous ammonia are introduced, the reactor contents are cooled, the stirring is slowed down to approximately 50 rev/min and degassing is performed. A heat treatment (15 minutes at 75° C.) is carried out a atmospheric pressure, the reactor contents are cooled and the residual vinyl chloride is removed by steam treatment. After filtering and drying, 1,010 g of polyvinyl chloride resin modified with polyepichlorohydrin (modified PVC) are collected in the form of whitish agglomerated granules with a mean diameter of 150 μm and a chlorine content of 54.4% by weight.

The modified polyvinyl chloride obtained (sample 1) has been compared, on the one hand, with polyvinyl chloride manufactured under the conditions of stage 2 (K value=64) (sample 2) and, on the other hand, with a mixture of polyvinyl chloride manufactured under the conditions of stage 2 (K value=64) and of polyepichlorohydrin (PEPI) manufactured under the conditions of stage 1 (PVC/PEPI weight ratio of 90:10 in the mixture) (sample 3).

The three samples have been examined in a composition containing, per 100 parts by weight of resin(s), 2 parts of a tin stabilizer, 0.15 part of a lubricant and 1 part of a polymeric processing aid.

Premixes, each 150 g in weight, were milled for 5 minutes at 190° C. on a roll mill. The crêpes obtained were then pressed for 5 minutes at 200° C. to form plaques 4 mm in thickness.

The results of the evaluations carried out on the crêpes and the plaques of the three samples are collated in Table I, appended.

EXAMPLE 2

Example 2 illustrates the manufacture of polyvinyl chloride modified with a random copolymer of ε-caprolactone and propylene oxide.

Stage 1

The procedure is as in stage 1 of Example 1, except that 1.69 g of organometallic catalyst (expressed as aluminium) and 700 g of vinyl chloride are employed and that a mixture of 240 g of ε-caprolactone and 60 g of propylene oxide is introduced at the copolymerization temperature of 50° C. (time=$t_o$). The copolymerization of ε-caprolactone and propylene oxide is stopped after 120 minutes ($t_o$+120 min) at 50° C. The degree of conversion is estimated at 96.3% (blank test).

Stage 2

Stage 2 is similar to stage 2 of Example 1, except that 1,500 g of water containing 52.5 g of a 2% solution of polyvinyl alcohol (viscosity of a 4% aqueous solution at 20° C.: 6 mPa s and molar degree of hydrolysis of 72%) is introduced at 50° C., after the stirring has been stopped. After the contents of the reactor have been cooled to 30° C. with stirring (500 rev/min), 1.4 g of lauroyl peroxide and 0.7 g of dicetyl peroxydicarbonate dissolved in 20 ml of dichloromethane are added. The reactor contents are heated to 54° C. (time=$t_o$). At $t_o$+30 minutes, 70 ml of a 2% solution of hydroxypropyl methyl cellulose with characteristics identical to that employed in Example 1 are introduced via a burette tube. When the operating pressure has dropped by 3 bars, the procedure is exactly as in stage 2 of Example 1. 919 g of polyvinyl chloride resin modified with a random copolymer of ε-caprolatone and propylene oxide (modified PVC) are collected in the form of translucent, nontacky spherical granules with a mean diameter of 150 μm and a chlorine content of 39% by weight.

The modified polyvinyl chloride obtained (sample 1) has been compared with a mixture of polyvinyl chloride manufactured under the conditions of stage 2 (K value=71) and a random copolymer of ε-caprolactone and propylene oxide, manufactured under the conditions of stage 1 (PVC/copolymer weight ratio of 70:30 in the mixture) (sample 2).

The two samples have been examined in a composition identical with that of Example 1. Premixes, each 150 g in weight were milled for 5 minutes at 160° C. and the crêpes obtained were pressed for 3.5 minutes at 165° C. to form plaques 4 mm in thickness.

The crêpe of sample 1 is markedly less opaque, more glossy and whiter than that of sample 2. Initial Shore A hardness (French standard NF T51-109) measured on a pressed plaque 4 mm in thickness at 23° C. is 85 in the case of sample 1 and 91 in the case of sample 2. To produce an initial Shore A hardness of 85, approximately 30 parts by weight of di-2-ethylhexyl phthalate (DOP) must be mixed with 70 parts by weight of polyvinyl chloride of K value=71.

EXAMPLE 3

Example 3 illustrates the manufacture of polyvinyl chloride modified with poly-ε-caprolactone.

Stage 1

The procedure is as in stage 1 of Example 2, except that 1.43 g of organometallic catalyst, expressed as aluminium, are employed and that 300 g of ε-caprolactone are introduced at time $t_o$. The polymerization of ε-caprolactone is stopped after 90 min ($t_o$+90 min) at 50° C. The degree of conversion is estimated at 99% (blank test).

Stage 2

Stage 2 is similar in every respect to stage 2 of Example 2. 924 g of polyvinyl chloride resin modified with poly-ε-caprolactone (modified PVC) are collected in the form of transparent, nontacky spherical granules with a mean diameter of 180 μm and a chlorine content of 38.7% by weight.

The modified polyvinyl chloride obtained (sample 1) has been compared with a mixture of polyvinyl chloride manufactured under the conditions of stage 2 (K value=71) and of poly-ε-caprolactone manufactured under the conditions of stage 1 (PVC/poly-ε-caprolactone weight ratio of 70:30 in the mixture) (sample 2).

The two samples have been examined in a composition identical with that of Example 1. The crepes and the plaques were manufactured under milling and pressing conditions which were identical with those of Example 2. Since the granules of poly-ε-caprolactone melt at about 65° C., the blend of sample 2 is difficult to gel. On the other hand, the gelling of sample 1 presents no problems. Plaques of both samples are transparent and slightly yellowed. Initial Shore A hardness (French standard NF T51-109) measured on a pressed plaque 4 mm in thickness at 23° C. is 78 in the case of sample 1 and 88 in the case of sample 2. To produce an initial Shore A hardness of 78, approximately 35 parts by weight of di-2-ethylhexyl phthalate (DOP) must be mixed with 65 parts by weight of polyvinyl chloride of K value=71.

EXAMPLE 4

This example illustrates the manufacture of a copolymer of vinyl chloride and 2-ethylhexyl acrylate modified with poly-ε-caprolactone.

Stage 1

The procedure is as in stage 1 of Example 2, except that 0.95 g of organometallic catalyst expressed as aluminium, is employed, together with 656 g of vinyl chloride, and that 200 g of ε-caprolactone are added at time $t_o$. The polymerization of ε-caprolactone is complete after 120 minutes at 50° C. The degree of conversion is estimated at 99% (blank test).

Stage 2

The procedure is as in stage 2 of Example 2, except that, after the stirring has been stopped, 1,500 g of water containing 105 g of a 2% solution of polyvinyl alcohol are introduced at 50° C. and that after the contents of the reactor have cooled to 30° C. with stirring (500 rev/min), 144 g of 2-ethylhexyl acrylate (EHA) are added. 1.6 g of lauroyl peroxide and 0.8 g of dicetyl peroxydicarbonate dissolved in 20 ml of dichloromethane are then injected. When the operating pressure has dropped by 3 bars, the procedure is exactly as in stage 2 of Example 1. 958 g of a copolymer of vinyl chloride with 2-ethylhexyl acrylate modified with poly-ε-caprolactone (modified PVC) are collected in the form of transparent, nontacky, spherical granules with a mean diameter of 200 μm and a chlorine content of 36.6% by weight.

The modified polyvinyl chloride obtained (sample 1) has been compared with two blends (samples 2 and 3) both containing a copolymer of vinyl chloride and 2-ethylhexyl acrylate manufactured under the conditions of stage 2 (viscosity index at 5 g/l in cyclohexanone and at 25° C.: approximately 140 ml/g) in a proportion of 80 parts by weight, on the one hand, of poly-ε-caprolactone manufactured under the conditions of stage 1 (sample 2) and, on the other hand, of di-2-ethylhexyl phthalate (DOP) (sample 3) in a proportion of 20 parts by weight.

The three samples have been examined in a composition identical with that of Example 1. The crêpes and the plaques were manufactured under milling and pressing conditions which were identical with those of Example 2.

The results of the evaluations carried out on the crêpes and the plaques of the three samples are collated in Table II, appended.

EXAMPLE 5

This example illustrates the manufacture of polyvinyl chloride modified with poly-ε-caprolactone in which the vinyl chloride (stage 2) is polymerized in aqueous emulsion.

A laboratory reactor identical with that employed in Example 1 is employed.

Stage 1

The procedure is as in stage 1 of Example 1, except that 0.24 g of organometallic catalyst, expressed as aluminium, is introduced, that the reactor contents are heated to 40° C. and that, once the set temperature has been reached, 50 g of ε-caprolactone are added via a burette tube (time=$t_o$). Stirring is stopped after 90 minutes' running at 40° C. (time=$t_o$+90 min). The degree of conversion of poly-ε-caprolactone is estimated at 99% (blank test).

Stage 2

Five minutes after the stirring has been stopped, 1,500 g of an aqueous solution containing 23 g of a 65.2% solution of dioctyl sulphosuccinate are added over 15 minutes via a burette tube. The stirrer is restarted (500 rev/min) and the reactor contents are cooled to 30° C. 15 cm$^3$ of a 15% solution of azobisisobutyronitrile in dichloromethane are then added. The reactor contents are heated to and maintained at 62° C. When the operating pressure has dropped by 3.5 bars, the polymerization autoclave contents are heated to 80° C. When the pressure reaches 6 bars, the stirring is slowed down to approximately 50 rev/min and degassing is carried out. When atmospheric pressure has been reached, the latex is brought to the boil while vacuum is applied. After boiling for 20 min, the latex is cooled to ambient temperature. The latex produced contains 34% of solids based on polyvinyl chloride modified with poly-ε-caprolactone. The resin obtained after spray-drying has a chlorine content of 530 g/kg (PVC-PLC composition≈93-7).

EXAMPLE 6

This example illustrates the manufacture of polyvinyl chloride modified with poly-ε-caprolactone, in which vinyl chloride (stage 2) is polymerized in aqueous microsuspension, also sometimes known as homogenized aqueous dispersion.

The principle of this process is as follows:
1. the reactants are premixed at ambient temperature in a first reactor, called a blending autoclave, under well-specified stirring conditions;
2. this mixture is then transferred into a homogenizer where the vinyl chloride containing dissolved poly-ε-caprolactone is emulsified in water by mechanical means;
3. on leaving the homogenizer, the emulsion is conveyed into the second reactor, called a polymerization autoclave;
4. after complete homogenization of the charge, the polymerization autoclave is brought up to polymerization temperature.

Two stainless steel laboratory reactors 3 liters in capacity are employed; they are equipped with a jacket for circulating a heat-transfer fluid, a conventional stainless steel paddle stirrer, a set of burette tubes for introducing reactants, a conventfonal temperature control system and a stainless steel laboratory homogenizer fitted with a homogenization valve, connected to both reactors.

Stage 1

Three evacuation cycles are applied to the whole system, each followed by a nitrogen rinse. The polymerization reactor and the homogenizer are then isolated. 0.47 g of organometallic catalyst, expressed as aluminium, is introduced, the blending autoclave being swept with nitrogen and at 25° C. The reactor is isolated and the stirrer is started up (250 rev/min). 1,000 g of vinyl chloride are introduced via a burette tube, and the contents are heated to 50° C. Once the set temperature has been reached, 100 g of ε-caprolactone are added via a burette tube (time=$t_o$). After 90 min, the contents are cooled to 20° C. Stirring is then stopped. The degree of conversion is estimated at 99% (blank test).

Stage 2

Five minutes after the stirring has been stopped, 1,350 g of an aqueous solution containing 6.3 g/l of sodium laurylbenzenesulphonate are added over 15 min via a burette tube. Stirring is restarted (250 rev/min). After 5 min, 2.5 g of dilauroyl peroxide and 0.6 g of dimyristyl peroxydicarbonate dissolved in 25 cm$^3$ of dichloromethane are added via a burette tube. 20 min after the addition of initiators, the valves connecting the homogenizer to the two reactors are opened. The homogenizer is started up with the working pressure regulated at 200 bars and the stirrer of the polymerization autoclave is driven at 150 rev/min. When the whole blend has been transferred, via the homogenizer, into the second reactor, the latter is isolated. The contents are then heated to 57° C. After a drop of 1 bar, the polymerization autoclave contents are heated to 80° C. When the pressure reaches 6 bars, the stirring is slowed down to approximately 50 rev/min and degassing is performed. When atmospheric pressure is reached, the latex is brought to boiling while vacuum is applied. After boiling for 20 min, the latex is cooled to ambient temperature. The latex obtained contains 40% of solids based on polyvinyl chloride modified with poly-ε-caprolactone, in the form of spherical particles whose distribution ranges from 0.05 to 2 μm. The resin obtained after spray-drying has a chlorine content of 490 g/kg (PVC-PCL composition≈86-14).

EXAMPLE 7

This example illustrates the manufacture of a random copolymer of vinyl chloride and 2-ethylhexyl acrylate modified with a random copolymer of ε-caprolactone and glycidyl methacrylate.

A laboratory reactor identical with that employed in Example 1 is employed.

Stage 1

Three evacuation.cycles are carried out, each followed by a nitrogen rinse. 0.95 g of an organometallic catalyst, expressed as aluminium, is introduced at 25° C. under a nitrogen blanket. The reactor is isolated and the stirrer is started up (250 rev/min). 656 g of vinyl chloride are introduced via a burette tube, and the reactor contents are heated to 40° C. Once the set temperature has been reached, 175.7 g of ε-caprolactone and 24.3 g of glycidyl methacrylate are introduced via a burette tube (time=$t_o$).

At $t_o$+6 hours, stirring is stopped. The degree of conversion of the random copolymer of ε-caprolactone and glycidyl methacrylate is estimated at 90% (blank test).

Stage 2

Five minutes after the stirring has been stopped, 1,200 g of water containing 4.8 g of polyvinyl alcohol are added over 15 min via a burette tube. The stirrer is restarted (500 rev/min) and the reactor contents are cooled to 30° C. 1.6 g of lauroyl peroxide and 0.8 g of dicetyl peroxydicarbonate dissolved in 20 cm$^3$ of dichloromethane are then injected.

The reactor contents are heated to a temperature of 54° C. At 54° C. (time=$t_o$) 144 g of 2-ethylhexyl acrylate are added gradually over 4 hours. When the pressure has dropped by 4.4 bars, 12.5 cm$^3$ of 2N ammonia are introduced, the reactor contents are cooled and the stirring is slowed down to approximately 50 rev/min and degassing is carried out. At atmospheric pressure, a heat treatment (15 min at 75° C.) is carried out, the reactor contents are cooled and residual vinyl chloride is removed by steam treatment. After dewatering and drying, 794 g of a resin of random copolymer of vinyl chloride and 2-ethylhexyl acrylate modified with a random copolymer of ε-caprolactone and glycidyl methacrylate are collected in the form of whitish spherical granules with a mean diameter of approximately 150 μm.

The resin obtained (sample 1) has been compared with an external blend of random copolymer manufactured under the conditions of stage 2 and of random copolymer from stage 1 (sample 2).

Both samples have been examined in a composition containing, per 100 parts by weight of resin, 2 parts of a tin stabilizer, 0.15 parts of a lubricant and 1 part of a polymeric processing aid. Premixes, each 150 g in weight, were milled on a roll mill.

The results of the evaluations of samples 1 and 2 are collated in Table III, appended.

EXAMPLE 8

This example illustrates the manufacture of polyvinylidene chloride modified with poly-ε-caprolactone.

An enamelled steel laboratory reactor 40 liters in capacity is employed; it is fitted with a jacket for circulating a heat-transfer fluid, a conventional enamelled steel paddle stirrer, a set of burette tubes for introducing reactants and a conventional temperature control system.

Stage 1

2 evacuation cycles are carried out (at 66.5 mbar), followed by a nitrogen rinse. 13,500 g of vinylidene chloride, 1,500 g of ε-caprolactone and 6.9 g of an organometallic catalyst, expressed as aluminium, are introduced via a burette tube. The reactor is isolated and the stirrer is started up (100 rev/min). The reactor contents are heated to 30° C. (time=$t_o$). Stirring is stopped after running for 8 h 30 min (time=$t_o$+8 h 30 min) and 306.4 g of solution (1) are withdrawn. After evaporation of the solution (1), 10 g of poly-ε-caprolactone are obtained (degree of conversion: 33%).

Stage 2

After the withdrawal of the solution, 20,250 cm$^3$ of demineralized water and 5,250 cm$^3$ of an aqueous solution containing 10 g/l of methyl hydroxypropyl cellulose are added.

The stirrer is restarted (160 rev/min) and the reactor contents are heated to 80° C.

1,000 cm$^3$ of a solution containing 165 g/l of dilauroyl peroxide are then added (time=$t_o$). After 14 hours (time=$t_o$+14 h), degassing is carried out while cooling.

After degassing, evacuation is commenced and the temperature is raised to 70° C. Evacuation is continued for 4 h and then cooling is applied and the vacuum is broken.

After dewatering, filtering and washing at ambient temperature and drying in a fluidized bed at 65° C., approximately 10,000 g of resin of polyvinylidene chloride modified with poly-ε-caprolactone are obtained, slightly pink-coloured in appearance and titrating at 70.1% by weight of chlorine.

EXAMPLE 9

This example illustrates the manufacture of a random copolymer of vinyl chloride and of vinylidene chloride modified with poly-ε-caprolactone.

An enamelled steel laboratory reactor identical with that employed in Example 8 is employed.

Stage 1

2 evacuation cycles are carried out (66.5 mbar), followed by a nitrogen rinse. 12,150 g of vinylidene chloride, 300 g of ε-caprolactone and 1.6 g of an organometallic catalyst expressed as aluminium are added via a burette tube. 2,850 g of vinyl chloride are then added. The reactor is isolated and the stirrer is started up (100 rev/min). The reactor contents are heated to 30° C. (time=$t_o$).

At $t_o$+8 hours, stirring is stopped. The degree of conversion of the poly-ε-caprolactone is estimated at 81% (blank test).

Stage 2

22,500 cm$^3$ of demineralized water and 3,000 cm$^3$ of aqueous solution containing 10 g/l of methyl hydroxypropyl cellulose are introduced via a burette tube.

The stirrer is restarted (140 rev/min) and the reactor contents are heated to 80° C.

At 80° C., 1,000 cm$^3$ of a solution containing 165 g/l of dilauroyl peroxide are added (time=$t_o$).

At $t_o$+8 hours, degassing is carried out while cooling. After degassing, evacuation is commenced and the temperature is raised to 70° C. Evacuation is continued for 4 h and then cooling is applied and the vacuum is broken.

After dewatering, filtering and washing at ambient temperature and drying in a fluidized bed at 65° C., approximately 9,000 g of a resin of a random copolymer of vinyl and vinylidene chlorides modified with poly-ε-caprolactone are obtained. This resin has the following characteristics:
relative viscosity
  at 10 g/l in DMF=1.32
  at 10 g/l in THF=1.44;
porosity by cold DOP absorption=28.2% (ISO standard: 4608).

EXAMPLE 10

This example illustrates the manufacture of polyvinylidene fluoride modified with poly-ε-caprolactone.

A stainless steel laboratory reactor identical with that employed in Example 1 is employed, except that its capacity is 5 liters.

Stage 1

3 evacuation cycles are carried out, followed by rinsing with nitrogen. 0.54 g of organometallic catalyst, expressed as aluminium, is added at 15° C. under a nitrogen blanket. The reactor is isolated and the stirrer is started up (250 rev/min). 950 g of vinylidene fluoride are added and the reactor contents are heated to 23° C. Once the set temperature has been reached, 100 g of ε-caprolactone are added via a burette tube (time=$t_o$). Stirring is stopped after 6 hours' running at 23° C. (time=$t_o$+6 h). The degree of conversion is estimated at 75% (blank test).

Stage 2

Five minutes after the stirring has been stopped, 1,500 g of an aqueous solution containing 2 g/l of hydroxypropyl methyl cellulose are added over 15 minutes via a burette tube. The stirrer is restarted (250 rev/min).

The reactor contents are cooled to 10° C. Once the set temperature has been reached, 20 g of diethyl peroxydicarbonate are added. The reactor contents are heated to 45° C. After 1 hour's running at 45° C., degassing is carried out at atmospheric pressure and vacuum is applied to finish the degassing.

After dewatering, filtering and washing at ambient temperature and drying in an oven at 80° C., 410 g of polyvinylidene fluoride resin modified with poly-ε-caprolactone, containing approximately 50% by weight of fluorine are obtained.

TABLE 1

| Properties evaluated | Sample 1 PVC modified according to Example 1 | Sample 2 PVC | Sample 3 PVC + PEPI (90:10) |
|---|---|---|---|
| Crêpe: | | | |
| Behaviour on milling | normal gelling, crêpe with high shrinkage | normal gelling, inert crepe | difficult gelling, inert crepe |
| Crêpe appearance | satiny, virtually transparent | glossy, transparent | satiny, translucent |
| Crêpe length, cm | 15 | 29 | 31 |
| Plaque: | | | |
| Vicat point B (method B) under 5 kg (French standard NF T51-021), °C. | 78 | 80 | 78 |
| Charpy toughness (DIN standard 53453, notched specimens), J/m² | 3.2 | 2.8 | 19.1 |

TABLE II

| Properties evaluated | Sample 1 PVC modified according to Example 4 | Sample 2 Copolymer VC-EHA + poly-ε-caprolactone (80:20) | Sample 3 Copolymer VC-EHA + DOP (80:20) |
|---|---|---|---|
| Crepe: | | | |
| Behaviour on milling | normal gelling, crepe with very high shrinkage | difficult gelling, crepe with high shrinkage | normal gelling, inert crepe |
| Crepe appearance | satiny | satiny | satiny, slight tack |
| Crepe length, cm | 18 | 20 | 44 |
| Plaque: | | | |
| Appearance | virtually transparent | slight opacity | opalescent |
| Initial Shore A hardness at 23° C. (French standard NF T51-109) | 77 | 87 | 87 |

TABLE III

| Properties evaluated | Sample 1 | Sample 2 |
|---|---|---|
| Crepe: | | |
| Behaviour on milling | Gelling impossible at 200° C., even after a period of more than 15 min. | Gelling at 160° C. High shrinkage on removal of the crepe. |
| Crepe appearance | — | satiny |
| Crepe length, cm | — | 20 |

We claim:

1. A process for the manufacture of vinyl halide polymers modified with polymers of heterocyclic oxygen, comprising:
   polymerizing in a first stage, a heterocyclic oxygen compound by an ionic route in a vinyl halide to produce a polymerization mixture, and
   polymerizing in a second stage, the said vinyl halide by a radical route in aqueous dispersion and in the presence of the polymerization mixture originating from the first stage.

2. The process for the manufacture of vinyl halide polymers modified according to claim 1, wherein the heterocyclic oxygen compound is chosen from cyclic ethers and esters.

3. The process for the manufacture of vinyl halide polymers modified according to claim 1, characterized in that the heteroyclic oxygen compound is a cyclic ether chosen from ethylene and propylene oxides, epichlorohydrin, allyl glycidyl ether, glycidyl methacrylate and mixtures thereof.

4. The process for the manufacture of vinyl halide polymers modified according to claim 1, wherein in that the heterocyclic oxygen compound is a cyclic ester chosen from propiolactone, caprolactone and oenantholactone.

5. The process for the manufacture of vinyl halide polymers modified according to claim 4, wherein the cyclic ester is caprolactone.

6. The process for the manufacture of vinyl halide polymers modified according to claim 1, wherein the vinyl halide corresponds to the general formula:

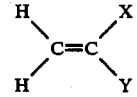

in which X denotes a halogen atom and Y denotes a hydrogen atom or a halogen atom which is identical with or different from X.

7. The process for the manufacture of vinyl halide polymers modified according to claim 1, wherein the vinyl halide is chosen from vinyl and vinylidene chlorides and fluorides.

8. The process for the manufacture of vinyl halide polymers modified according to claim 7, wherein vinyl halide is vinyl chloride.

9. The process for the manufacture of vinyl halide polymers modified according to claim 1, wherein, in the first stage, the ionic polymerization is carried out with the use of a coordinated anionic catalyst of general formula:

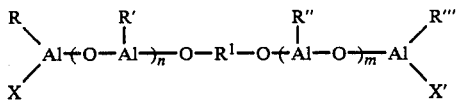

in which n and m denote integers from 0 to b 10, whose sum is at least 1; R, R', R" and R'" denote hydrocarbon groups containing from 1 to 18 carbon atoms; X and X' denote hydrogen, chlorine or a group R; and R¹ denotes a hydrocarbon group containing from 2 to 20 carbon atoms.

10. The process for the manufacture of vinyl halide polymers modified according to claim 1, wherein, in the second stage, the radical polymerization in aqueous dispersion is carried out in aqueous suspension.

11. The process for the manufacture of vinyl halide polymers according to claim 1, including in the second stage an unsaturated monomer capable of being polymerized by a radical route with vinyl halide.

* * * * *